United States Patent [19]

Webster et al.

[11] 3,778,229
[45] Dec. 11, 1973

[54] OZONE GAS DETECTOR

[75] Inventors: Harold F. Webster, Scotia; Lawrence A. Harris, Schenectady, both of N.Y.

[73] Assignee: General Electric Company, Schenectady, N.Y.

[22] Filed: Mar. 29, 1972

[21] Appl. No.: 239,215

[52] U.S. Cl. ............ 23/254 E, 73/27 R, 324/65 R, 324/71 SN, 338/34, 340/237 R
[51] Int. Cl. .......................................... G01n 27/14
[58] Field of Search................. 324/65 R, 65 CR, 324/71 SN; 73/27 R; 338/34; 340/237 R; 23/254 E, 255 E

[56] References Cited
UNITED STATES PATENTS 3,695,848   10/1972   Taguchi ......................... 73/27 R X
2,975,362   3/1961    Jacobson ........................ 324/71 SN
3,676,820   7/1972    Taguchi ............................. 338/34
3,699,803   10/1972   Sumi et al. ..................... 324/71 SN

*Primary Examiner*—Stanley T. Krawczewicz
*Attorney*—John F. Ahern et al.

[57] ABSTRACT

A tubular substrate of high electrical resistivity is provided with a metal oxide coating whose resistance increases significantly with ozone concentration in the atmosphere. Electrodes connected to the metal oxide coating at the tube ends provide a means for connection to an electronic circuit for obtaining a signal of level sufficient to operate a meter or alarm device.

1 Claim, 3 Drawing Figures

PATENTED DEC 1 1 1973   3,778,229

OZONE GAS DETECTOR

Our invention relates to a device for detecting ozone gas in the atmosphere, and in particular, to a small size, simple, low cost sensor and circuit embodiment thereof for providing a signal indicating the presence of a particular level of the ozone.

The presence of ozone, and in particular, the presence of ozone in concentrations in excess of 0.05 parts per million (ppm), is a condition which should be known in order to safeguard the health of persons exposed to such ozone atmosphere. A concentration of 0.1 ppm by volume has been established as the maximum allowable concentration of ozone for continuous exposure. Ozone gas is generated in various high voltage electrical apparatus such as the electrostatic type air cleaner, and is used in the ozonolysis of oleic acid in industrial waste-treatment, and in water disinfection treatment as typical examples. Various types of ozone gas detectors are known, but each is a complex, large size, costly device. Examples of conventional ozone detectors are the types which oxidize a potassium iodide solution by a chemical method in the presence of ozone, and an ultraviolet photometric process device.

Therefore, it is a principal object of our invention to provide a new and improved ozone gas detector which is of simple construction, small size and inexpensive to manufacture.

Another object of our invention is to provide an ozone gas detector having a relatively low operating temperature in order to insure long life for the detector.

Briefly, and in accordance with our invention we provide an ozone gas detector which comprises a tubular substrate of high electrical resistivity material having a thin coating thereon of a metal oxide whose resistance changes significantly with ozone gas concentration in the atmosphere, the change in resistance being determined by the ozone concentration. Electrodes are connected on the metal oxide coating along the ends of the tubular substrate and suitable leads are attached for connection to a serially connected voltage amplifier and constant voltage or constant current source for developing a voltage signal of magnitude sufficient to operate a voltmeter or suitable alarm device. A heating coil disposed in the hollow of the tubular substrate heats the metal oxide coating to a particular operating temperature.

The features of our invention which we desire to protect herein are pointed out with particularity in the appended claims. The invention itself, however, both as to its organization and method of operation together with further objects and advantages thereof, may best be understood by reference to the following description taken in connection with the accompanying drawings wherein like parts in each of the several figures are identified by the same reference character, and wherein:

Detectors for sensing and measuring hydrogen and other reducing gases and which utilize thin films of a metal oxide as the gas sensing element are known as is described in U.S. Pat. No. 3,479,257, inventor Paul J. Shaver and assigned to the assignee of the present invention. The hydrogen detector described in the aforementioned patent requires an activating catalyst which is deposited on the metallic oxide thin film and the device operates by the hydrogen gas reacting with the metallic oxide in the localized presence of the catalytic deposits to produce a significant decrease in the electrical resistance of the metallic oxide thin film. In contradistinction to the hydrogen detector described in the aforementioned patent, we provide an ozone gas detector which does not require an activating catalyst and operates in the opposite manner from that of the hydrogen gas detector in that the electrical resistance of our metallic oxide thin film increases significantly when exposed to ozone gas. Finally, our detector is not capable of detecting hydrogen gas to any significant extent.

Figure 1:
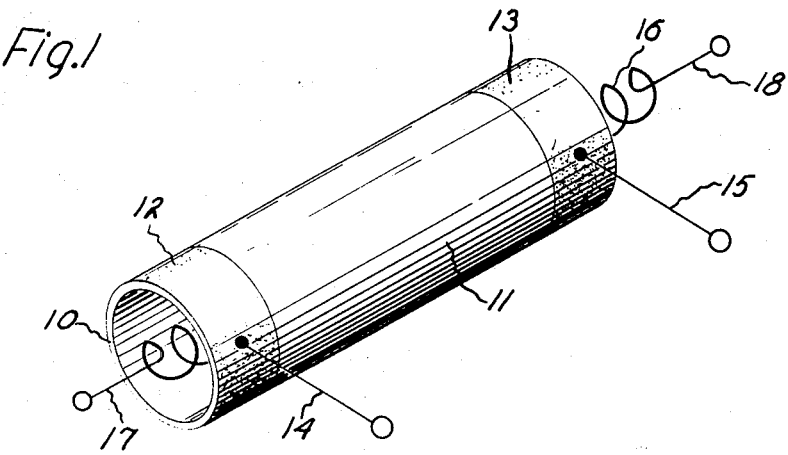
FIG. 1 is an isometric view of a preferred embodiment of our ozone gas detector.
Figure 2:
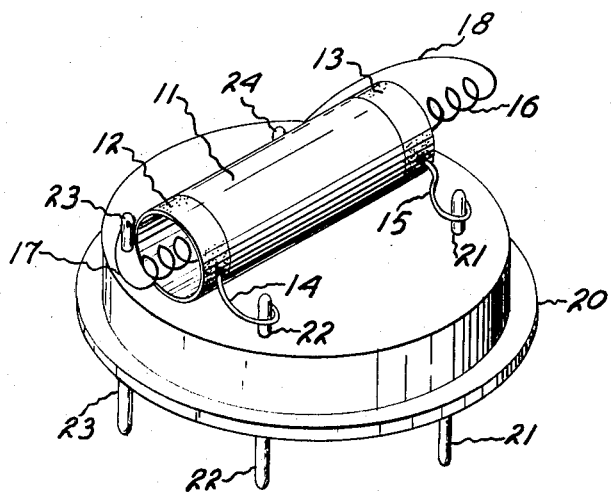
FIG. 2 illustrates our detector supported on a plug type base member.

Referring now in particular to FIG. 1, there is illustrated the sensing portion of our detector and comprises a tubular substrate 10 having deposited on its outer surface a thin coating or film 11 of a metal oxide whose resistance changes significantly with ozone concentration in the atmosphere surrounding the sensing element. The tubular substrate member 10 is preferably in the form of a hollow right cylinder and is fabricated of a material which can withstand temperatures in the range of up to approximately 300°C, is inert, undergoes substantially no chemical decomposition at the operating temperature of the detector as well as having substantially no chemical reaction with the metal oxide coating, and has a high electrical resistance that remains higher than the resistance of the metal oxide thin film during operation of the ozone gas detector. Thus, the tubular substrate is preferably formed of refractory and other relatively high temperature type materials such as quartz, sapphire, yttria, alumina, beryllia, or the like, and mixtures thereof. The metallic oxide thin film is preferably coated along the entire outer surface of substrate member 10 for ease of fabrication. Electrodes 12 and 13 in the form of electrically conductive strips coated on the metal oxide coating along the two ends of tubular substrate member 10 provide a means for connection of suitable electrical leads 14 and 15 thereto. Each of conductor strips 12 and 13 may be of length up to approximately one-eighth of the overall length of substrate body 10. Electrodes 12 and 13 may also be thin films deposited on the metallic oxide film or strips or wires which are mechanically bonded thereto. The electrodes are made of a material which forms good electrical contact with the metallic oxide thin film and may comprise any conventional electrically conductive material such as platinum, gold, copper, silver and alloys thereof as typical examples. The leads 14 and 15 likewise are formed of an electrically conductive material having a very low electrical resistance and not subject to oxidation at the sensor operating temperature, such as gold and nickel, and such wires are securely connected to electrodes 12 and 13 by any suitable manner for obtaining good electrical and mechanical contact such as by welding or bonding.

The metal oxide thin film 11 whose resistance changes (increases) significantly with (increased) ozone concentration in the surrounding atmosphere, and which is the essence of our invention, is comprised of a suitable metallic oxide which occurs in several valence states having significantly different resistivities to thereby produce the significant changes in resistance in ozone environments. By significant increase in resistance, it is meant that the resistance increases nonlinearly by a factor of at least 100 in response to an ozone gas concentration increase from zero to 100 parts per million. The most suitable metallic oxide which has been investigated is that of indium which has various valence states in the form of $In_2O$, $InO$ and $In_2O_3$. Other suitable metal oxides are the oxides of tin, bismuth and antimony.

The metallic oxide thin film 11 may be deposited on tubular substrate 10 by the following method as one typical example. The indium metal is placed in an evaporating boat enclosed in a suitable container such as a bell jar whih is provided with a shield for separating the evaporating boat from the tubular substrate. The evaporating boat is initially heated to a temperature in the range of 550° to 650°C for boiling off any volatile undesired products from such metal, the heating time at such elevated temperature being sufficiently short to prevent significant evaporation of the indium. The purified indium metal is then cooled and subjected to a partial pressure of oxygen in the range of 50 to 100 torr. Finally, the shield within the bell jar is removed and the bell jar container is heated to a temperature in the range of 500° to 600°C which results in the indium evaporating and combining with the oxygen, and the indium oxide coating the tubular substrate by evaporation deposition.

A heater element 16 in the form of a length of coiled wire of an electrically conductive material suitable for resistance heating, such as tungsten or nichrome, has the ends thereof connected through suitable leads 17, 18 to a source of alternating or direct current power. Since our detector is of very small size, as will be described hereinafter, the electrical power requirements for heating the sensor portion of our detector to its operating temperature are also low, generally less than 1 watt. The coil 16 formed by the heater wire preferably has an outer diameter somewhat smaller than the inner diameter of tubular substrate 10, such as approximately three-fourths thereof as a typical example to thereby reduce the likelihood of the heater coil 16 being in significant contact with tube 10, a slight contact therewith does not significantly affect the satisfactory operation of our detector.

In the operation of our detector, ozone gas reacts with the metallic oxide thin film at the operating temperature of the device to produce the significant change in the electrical resistance of the metallic oxide thin film. The response time of our detector in the increasing resistance direction varies with the thickness of the metal oxide thin film and the concentration of the ozone gas and is generally several seconds. The response time in the decreasing resistance direction due to a reduction in concentration or absence of the ozone gas is somewhat longer, but decreases with increased operating temperature. The elevated operating temperature of our device is necessary in order to produce an increased reaction rate between the ozone gas and the thin film oxidation state, and is in the range of 150° to 300°C.

It has been found that the resistance factor change obtained with our detector device varies nonlinearly in accordance with the following equation:

$$I_{air}/I_{O_3} = 1 + 10\sqrt{C}$$

where $I_{air}$ is the sensor electric current is air alone, $I_O$ is a sensor with ozone gas present, when measured in a circuit including a constant voltage source, and $C$ is the ozone concentration in parts per million.

As a typical example, a tubular substrate member 10 is fabricated of quartz and operated at a temperature of 300°C. Indium oxide is utilized as the metal oxide thin film 11 and its resistance increases from 1 megohm in air to 100 megohm in an ozone gas concentration of 10 parts per million. The sensor portion of our ozone gas detector consisting of tubular substrate member 10, metal oxide thin film 11 and electrodes 12 and 13 can be fabricated in sizes as small as approximately 1/16 inch diameter and ⅛ inch length. The wall thickness of tubular substrate member 10 is not critical and can be as small as 0.010 inch for the very small size sensor, and the thickness of metal oxide film 11 is generally in the range of 50 to 100 Angstroms, but in any case, is of sufficient thickness to obtain a resistance in the order of 1 megohm at room temperature. This small size readily adapts the sensor for positioning in virtually any location. Thus, it can readily be positioned in the output air flow duct of an electrostatic precipitator air cleaner for monitoring the output air flow as to the ozone gas concentration therein. In like manner, our detector may be mounted at the output of a waste disposal system for measuring the amount of ozone gas escaping with the effluent. The small size and simple structure of our ozone gas sensor, as well as the small size and simple structure of the detector which embodies such sensor, and will be described hereinafter, result in a detector which is several orders lower in cost than the conventional means for monitoring and measuring ozone gas concentration presently available, and yet has the sensitivity thereof.

Although the sensor portion of our detector as described hereinabove with reference to FIG. 1 may be directly connected to a suitable signal amplifying electronic circuit by means of leads 14 and 15, it may often be more conveniently supported on a base 20 of a type conventionally used for transistors and the like. Base 20 is provided with four electrically conductive pins 21, 22, 23 and 24 which pass through the top and bottom surfaces of base 20 and thereby permit the sensor to be plugged into the electronic circuit. The sensor is spaced from the top surface of base 20 by means of the relatively rigid leads 14 and 15 which connect the electrodes 12 and 13 to pins 22 and 21, respectively. The leads 17 and 18 connected to the ends of heater element 16 are connected to pins 23 and 24, respectively. Base member 20 is fabricated of an electrically insulating, relatively high temperature, material such as a ceramic or glass and provides a convenient means for inserting and removing the sensor from the circuit without the need for providing a solder or other more permanent type connection. Since the sensor may have overall dimensions as small as in the order of one-sixteenth inch × one-eighth inch, base 20 may also be of very small size and have a diameter in the order of three-eighths inch and a height, excluding the pins, of approximately one-eighth inch.

The sensor portion of our detector as illustrated in FIG. 1 is basically an impedance transducer and operates in a high impedance region generally in the range of one to 1,000 megohms. Because of such high impedance, an ohmmeter used as the resistance change detecting means is not satisfactory. Also, because of this high impedance operation of our detector, any signals generated are of very small magnitude and therefore require considerable amplification in order to be useful. Due to the high impedance level of our sensor, a voltage amplifier 30 utilizing field effect transistor devices is a preferred circuit for obtaining necessary voltage amplification and providing the desired impedance matching between the sensor and amplifier input. In the case of amplifier 30 being of the voltage type, a constant current source 31 is preferably utilized (especially if there is a poor signal-to-noise ratio environment), although a constant voltage source may alternatively be used. In one conventional embodiment, constant current source 31 consists of a transistor having its emitter electrode connected through a first resistor to a source of voltage and its base electrode connected through a zener diode to the same source of voltage. The base electrode is also connected through a second resistor to ground. The current output from the collector electrode is relatively constant and equal to the voltage across the zener diode divided by the resistance of the first resistor. Obviously, many other types of conventional constant current sources may also be utilized. The voltage amplifier 30 may be a multi-stage operational amplifier of conventional type utilizing, at least in the first stage thereof, a field effect transistor in a preferred embodiment. Alternatively, although not the preferred embodiment, amplifier 30 may be of the current amplifying type and utilize an operational amplifier consisting of a plurality of bipolar transistors. The choice of utilizing a voltage or current amplifier 30 depends upon the impedance level, noise and environment, and due to the high impedance of our ozone gas sensor, the voltage amplifier approach is preferred over the current amplifier approach. Obviously, many other types of signal amplifying means may be utilized in circuit relationship with leads 14 and 15 of the sensor, another convenient approach being a bridge circuit of three fixed resistors and the fourth resistor being the sensor through connections via leads 14 and 15, a fixed D.C. voltage being applied across two diametrically opposite junctures of the bridge and the bridge output being taken across the other two junctures.

Figure 3:
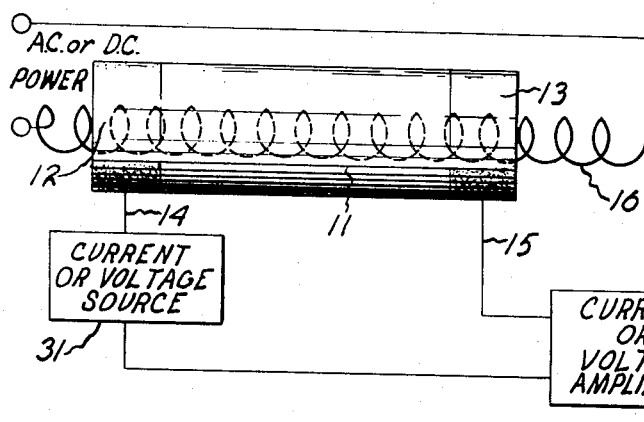
FIG. 3 is a partially schematic circuit diagram of our detector connected to suitable read-out means.
Figure 3:
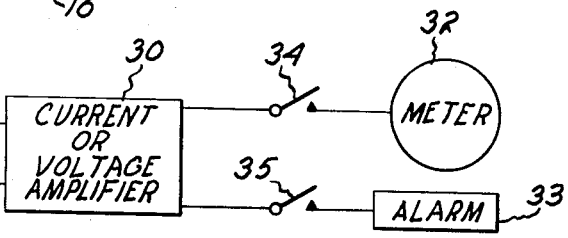

The output of amplifier 30 is connected to a suitable meter 32 which can be calibrated for reading directly the ozone concentration in parts per million. Thus, in the case of amplifier 30 being a voltage amplifier, meter 32 is a conventional voltmeter prefereably provided with multiple scales and means for switching between such scales, and each scale may be calibrated in terms of the ozone concentration. Alternatively, a conventional voltmeter, preferably with multiple scales, can be utilized and suitable calibration charts provided for converting the voltmeter reading to ozone gas concentration. In many applications, however, the concentration of the ozone gas need not be continuously monitored, but rather, an alarm type monitoring is required whereby a particular arm is generated upon the ozone concentration reaching a prescribed level. In this latter type of read-out means, a suitable alarm 33 is connected to the output of amplifier 30. Alarm 33 may be of any conventional type and includes the visual type such as an indicator lamp, the audible type such as a bell, or the alarm may be a relay or other suitable device for actuating a protective component in the circuit in which our detector is utilized. In the case wherein both a continuous monitoring read-out means such as meter 32 and on-off read-out means such as alarm 33 are both utilized, switches 34 and 35 may be utilized for selectively connecting the outputs of the amplifier to the read-out devices. Thus, the detector circuit illustrated in FIG. 3 can provide continuous or on-off alarm monitoring of the ozone concentration of the environment in which the sensor portion of the detector is located. Due to the small size of the sensing portion of our detector, and the ability to fabricate operational amplifiers in integrated circuit form, the sensor and amplifier 30, as well as the constant current source 31 may be fabricated in integrated circuit form resulting in a small size, simple structure ozone gas detector which is inexpensive to manufacture as compared to the conventional apparatus presently used for detecting ozone gas concentrations.

From the foregoing description, it can be appreciated that our invention makes available a new ozone gas detector which is simple in construction, of very small size and inexpensive to manufacture and has the capability of measuring ozone gas over a large range of concentrations, and in concentrations less than 0.01 parts per million which cannot be detected by smell. The low temperature operation of the sensor assure a long detector life.

Having described our invention, it is believed obvious that modification and variation of our invention is possible in the light of the above teachings. Thus, the substrate on which is coated the thin film of metal oxide may have forms other than tubular and the electrodes at the ends thereof may be of various types as described hereinabove. Further, the metal oxide coating can be on the inner surface of the tubular substrate, and, or, the heater can be coiled in closely spaced relationship to the outer surface of the tubular substrate, although these are not preferred embodiments. Finally, the means for amplifying the signal developed across the output leads of the sensor portion of our detector may be of any of a number of conventional types. It is, therefore, to be understood that changes may be made in the particular embodiment of our invention as described which are within the full intended scope of the invention as defined by the following claims.

What we claim as new and desire to secure by Letters Patent of the United States is:

1. An ozone gas detector having the capability for measuring gas concentrations less than 0.01 parts per million and comprising a substrate in the form of a tubular body having major outer and inner surfaces, said substrate fabricated of a refractory material having high electrical resistivity and substantially no chemical activity at the operating temperature of the detector which is in the range of 150° to 300°C, an indium oxide coating on the outer surface of said tubular substrate, the indium oxide being a material having a resistance which increases significantly in the presence of ozone gas, the indium oxide coating being of relatively constant thickness dimension in a range of 50 to 100 Angstroms, electrode means connected to said indium oxide coating in spaced apart relationship, means for heating said indium oxide coating to a particular operating temperature through the inner surface of said tubular substrate, and electronic circuit means in communication with said electrode means for detecting change of resistance of said indium oxide coating located between said electrode means in the presence of ozone gas in the atmosphere surrounding the indium oxide coating, the indium oxide coating and thickness thereof in the range of 50 to 100 Angstroms providing a capability for measuring ozone gas in concentrations less than 0.01 parts per million.

* * * * *